United States Patent [19]

Mueller et al.

[11] Patent Number: 4,692,912
[45] Date of Patent: Sep. 8, 1987

[54] AUTOMATIC FORCE CONTROL FOR A SEISMIC VIBRATOR

[75] Inventors: Allan H. Mueller, Houston; Dean P. Perkins, Pasadena; Rhys M. Evans, Houston, all of Tex.

[73] Assignee: Geosource, Inc., Houston, Tex.

[21] Appl. No.: 676,718

[22] Filed: Nov. 30, 1984

[51] Int. Cl.[4] .......................................... H04R 23/00
[52] U.S. Cl. .................................... 367/190; 367/189; 181/113; 181/121
[58] Field of Search ................... 367/190, 189, 73, 46; 181/121, 401; 324/83 FE

[56] References Cited

U.S. PATENT DOCUMENTS

| | | |
|---|---|---|
| 3,208,550 | 9/1965 | Castanet . |
| 3,216,525 | 11/1965 | Fail . |
| 3,234,504 | 2/1966 | Wischmeyer . |
| 3,460,648 | 8/1969 | Brown . |
| 3,795,286 | 3/1974 | Meyer ................................. 367/190 |
| 3,815,704 | 6/1974 | Eisner ............................ 340/15.5 R |
| 3,895,343 | 7/1975 | Farr ................................. 324/83 FE |
| 4,049,077 | 9/1977 | Mifsud . |
| 4,063,613 | 12/1977 | Silverman . |
| 4,184,144 | 1/1980 | Rickenbacker ...................... 367/137 |
| 4,197,750 | 4/1980 | Hassler ................................... 367/46 |
| 4,516,230 | 5/1985 | Goodloe et al. ..................... 367/190 |
| 4,616,352 | 10/1986 | Sallas et al. ......................... 367/190 |

OTHER PUBLICATIONS

Lerwill, W. E., "The Amplitude and Phase Response of a Seismic Vibrator," 1982.
Lerwill, W. E. "Vibrator Output Power Experiment," May 4, 1982.

Primary Examiner—Charles T. Jordan
Assistant Examiner—John W. Eldred
Attorney, Agent, or Firm—Arnold, White & Durkee

[57] ABSTRACT

The present invention provides a method and apparatus for controlling the response of a seismic vibrator during its actuation period. The sweep input signal is modified in response to an average of the force applied to the earth by the vibrator over at least one cycle of the sweep signal. Additionally, this modified drive signal may be further adjusted by selective adjustment of the amplitude of the signal within selected frequency ranges.

13 Claims, 10 Drawing Figures

AUTOMATIC FORCE CONTROL FOR A SEISMIC VIBRATOR

BACKGROUND OF THE INVENTION

1. Field of the Invention

The present invention relates generally to methods and apparatus for seismic exploration, and, more particularly, relates to a method and apparatus for controlling the vibrating force imparting to the ground in such prospecting.

2. Description of the Prior Art

Hydraulic vibrators are commonly used in seismic prospecting to impart seismic waves into the earth's crust. The vibrator causes a baseplate loaded by an isolated mass, normally the carrier vehicle, to vibrate against the earth's surface. If the vibrating force is to great, i.e. exceeds the sum of the masses of the reaction mass, baseplate, and holddown force, the baseplate lifts off the ground, i.e., "decouples", which is an undersirable result. When the baseplate decouples and then subsequently engages the earth's surface undesired noise sources, which are caused by the baseplate slapping the ground, interfere with the other seismic waves that are being measured by the geophones.

A desired frequency range of a seismic hydraulic vibrator is generally considered to be from 5 to about 200 Hz. The maximum hydraulic force that seismic vibrators generate is typically about 50,000 lbs. Seismic energy sources with this force and frequency range present some conflicting design requirements. For example, the size and hence the weight of the baseplate should be larger for lower frequencies and smaller for higher frequencies. The size and weight of the baseplate affects the frequency at which maximum energy is coupled to the earth, as well as the efficiency of such coupling. Other conflicts appear when considering the stiffness and weight of the main piston/baseplate structure. The mass of the structure should be small, however, the structure should preferably be stiff enough to avoid mechanical resonances below about 2.5 times the maximum operating frequency. The main piston stroke length should generally be as short as possible and should trap a minimal volume of hydraulic fluid within the cylinder. The main piston stroke length, however, must still be long enough to accommodate the lowest frequency. In many vibrators, a servo hydraulic valve is utilized to drive the vibrator piston of the vibrator. This servo hydraulic valve must be large enough for the lowest frequency and yet fast enough for the highest frequency.

Differences in earth surface conditions (earth impedance) influence a natural resonant frequency between the earth and the vibrator. The natural resonant frequency of the vibrator/earth system typically occurs in a frequency range of 20 to 45 Hz. Optimal earth coupling of most hydraulic vibrators appears to be achieved in this range.

In a vibrator wherein a servo hydraulic valve is used to drive the main piston, the valve is often precisely controlled by a feedback amplifier so that the position of the valve spool corresponds to the input voltage of the amplifier. This input voltage is typically a constant amplitude sweep frequency. Servo control stops at the output of this valve, and the main hydraulic force generator operates without feedback control. Therefore, the output response of the hydraulic force generator is determined by the natural response characteristics of the earth/hydraulic generator system and is subject to undesirable variations.

The typical force response characteristics of a seismic vibrator (measured at the main hydraulic piston) are as follows: beginning at 5 Hz, the force is about 12 decibels below normal output, and increases at the rate of 6 decibels per octave up to the earth/hydraulic system resonant frequency, for example, 25 Hz. From system resonance to the maximum frequency response of the servo valve (80 to 150 Hz), the response is relatively flat at 0 decibels. Above the maximum of level frequency of level valve amplitude response, the response falls off at a rate of 6 decibels to 12 decibels per octave. At system resonance, a response peaking of 4 decibels to 10 decibels is typically observed. Thus, force variations of 16 decibels to 22 decibels have occurred over the normal frequency range of the vibrator.

Various attempts have been made to devise a feedback loop that will accurately minimize these vibratory variations. In U.S. Pat. No. 3,208,550 to Castanet, there is disclosed a vibrator with an automatic controlling system in which the force imparted to the earth is kept proportional to a controlling electrical signal. Mifsud, in U.S. Pat. No. 4,049,077, discloses generating a feedback signal equal to the instantaneous amplitude of either the baseplate velocity or displacement and utilizing one of these feedback signals to control the instantaneous motion of the baseplate. The system disclosed in Mifsud requires a determination in advance, for a particular location, of the maximum velocity or displacement amplitude that can be generated over the frequency range of interest without decoupling the baseplate from the ground. Rickenbacker, in U.S. Pat. No. 4,184,144, discloses using a signal related to the peak force transmitted by the baseplate in a controlled network, to either manually or automatically vary the amplitide of the input signal to the vibrator.

An automatic gain control system such as Rickenbacker's system has the disadvantages that the feedback loop may be not fast or smooth enough, particularly at low frequencies, and also will not improve the system phase response.

Another method of force amplitude correction is the frequency equalizer method. In this method, the equalizer circuit generates a transfer function which is the inverse of the system transfer function. Combining these two transfer functions produces an overall transfer function which is uniform over the operating range. With this method, however, accuracy of the amplitude and phase corrections may be no more accurate than the accuracy of the match between the two complementing transfer functions. Accordingly, the present invention provides a new method and apparatus for controlling the operation of a hydraulic vibrator offering optimal speed and frequency response as well as optimal accuracy of the vibrator amplitude.

SUMMARY OF THE INVENTION

In accordance with the present invention, method and apparatus are provided for processing signals proportional to the acceleration of both the reaction mass and baseplate of a hydraulic vibrator, in a way that takes into account the signal irregularities caused by the many factors such as soil conditions hydraulic fluid, etc.

A force control system in accordance with the present invention comprises a combination of both frequency equalizer and automatic gain control methods.

In accordance with the present invention, only an approximate match of transfer functions is required in the frequency equalizer circuit in order to significantly improve the speed and phase response of the system over prior art techniques. According to the present invention, overall amplitude accuracy is automatically controlled by the automatic gain control circuit. Other important features of the invention are that the degree of match in the equalizer circuit can be monitored from the front panel of the instrument. Also, the frequency equalizer can be changed in the field, if required, without special equipment. In another embodiment, the equalizer may be automatically controlled by an adaptive controller such as a microprocesser adaptive controller.

DESCRIPTION OF THE PREFERRED EMBODIMENTS

Figure 1:
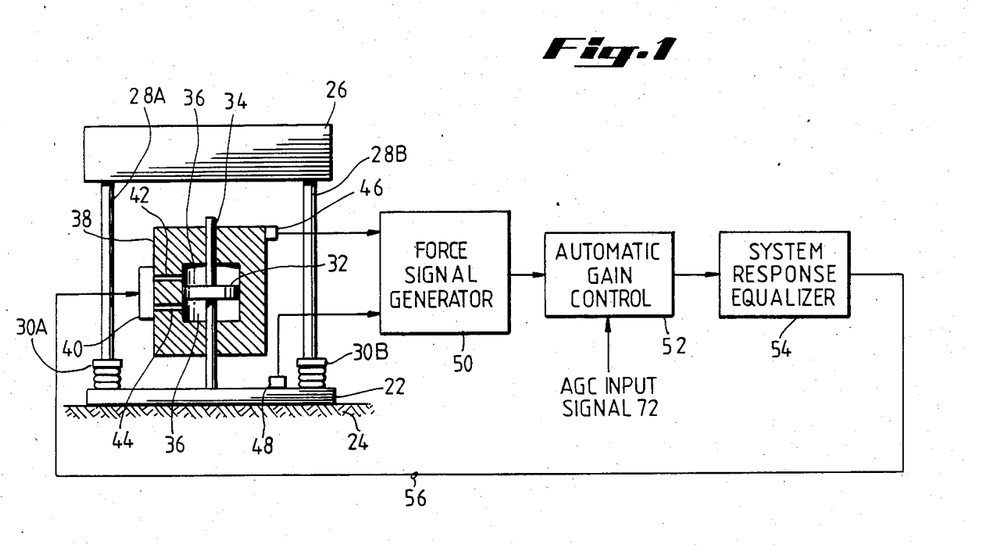
FIG. 1 shows a block diagram of a preferred embodiment of the invention.

Referring now to FIG. 1, therein is illustrated a vibrator control system in accordance with the present invention, depicted in block diagram form, and connected to a hydraulic seismic hydraulic vibrator 20. The vibrator 20 includes a baseplate 22 in contact with the earth's surface 24. The baseplate 22 is held against the earth's surface by the holddown weight 26. The holddown weight 26 is applied to the baseplate 22, by means of the lift assembly 28A, 28B, through the isolation air bags 30A, 30B.

The seismic hydraulic vibrator 20 further includes a piston 32 connected to the baseplate 22 by means of a piston rod 34. The piston 32 is adapted for reciprocating movement within a cylinder 36. The housing of the cylinder 36 comprises a heavy reaction mass 38. A servo vlve 40 is provided for communicating hydraulic pressure to either side, or the other of piston 32 through ports 42 and 44. The operations of servo valve 40 is controlled by means of an electrical input signal in a manner known to the art, for example, as disclosed in U.S. Pat. No. 3,208,545.

During operation of the seismic hydraulic vibrator 20, the hydraulic pressure generates two forces of equal magnitude in opposite directions on the reaction mass 38 and on the piston 32.

The force imparted to the ground can be determined by generating signals proportional to the acceleration of the baseplate 22 and to the acceleration of the reaction mass 38, then multiplying these two signals by a factor equivalent to the respective masses of the baseplate 22 and the reaction mass 38, and then combining the two resulting signals.

When the force acting on the baseplace 22 generated in the upper direction exceeds the force tending to hold the baseplate 22 on the ground, the baseplate 22 begins to decouple from the ground 24. Since force is the product of mass times acceleration, and since for any given seismic hydraulic vibrator the holddown weight 26 will normally be known, measuring the acceleration of the reaction mass 38 and of the baseplate 22 will provide a signal proportional to the force on the baseplate 22 which should not exceed the total holddown force.

In accordance with the present invention, accelerometers, preferably Model No. 328, such as manufactured by PCB Piezotronics Inc. are mounted on the seismic hydraulic vibrator 20. An accelerometer 46 is mounted on the reaction mass 38, and an accelerometer 48 is mounted on the baseplate 22. The signals generated by accelerometers 46, 48 pass to a force signal generator 50. The force signal generator 50 is responsive to the signals from the accelerometers 46, 48 and generates a signal that passes to the automatic gain control circuit 52. The automatic gain control circuit 52 is coupled to a system response equalizer circuit 54. The system response equalizer circuit 54 is responsive to the automatic gain control circuit 52. The system response equalizer circuit 54 generates a signal 56 which is amplified and transmitted to the servo valve 40 of the seismic hydraulic vibrator 20.

Figure 2:
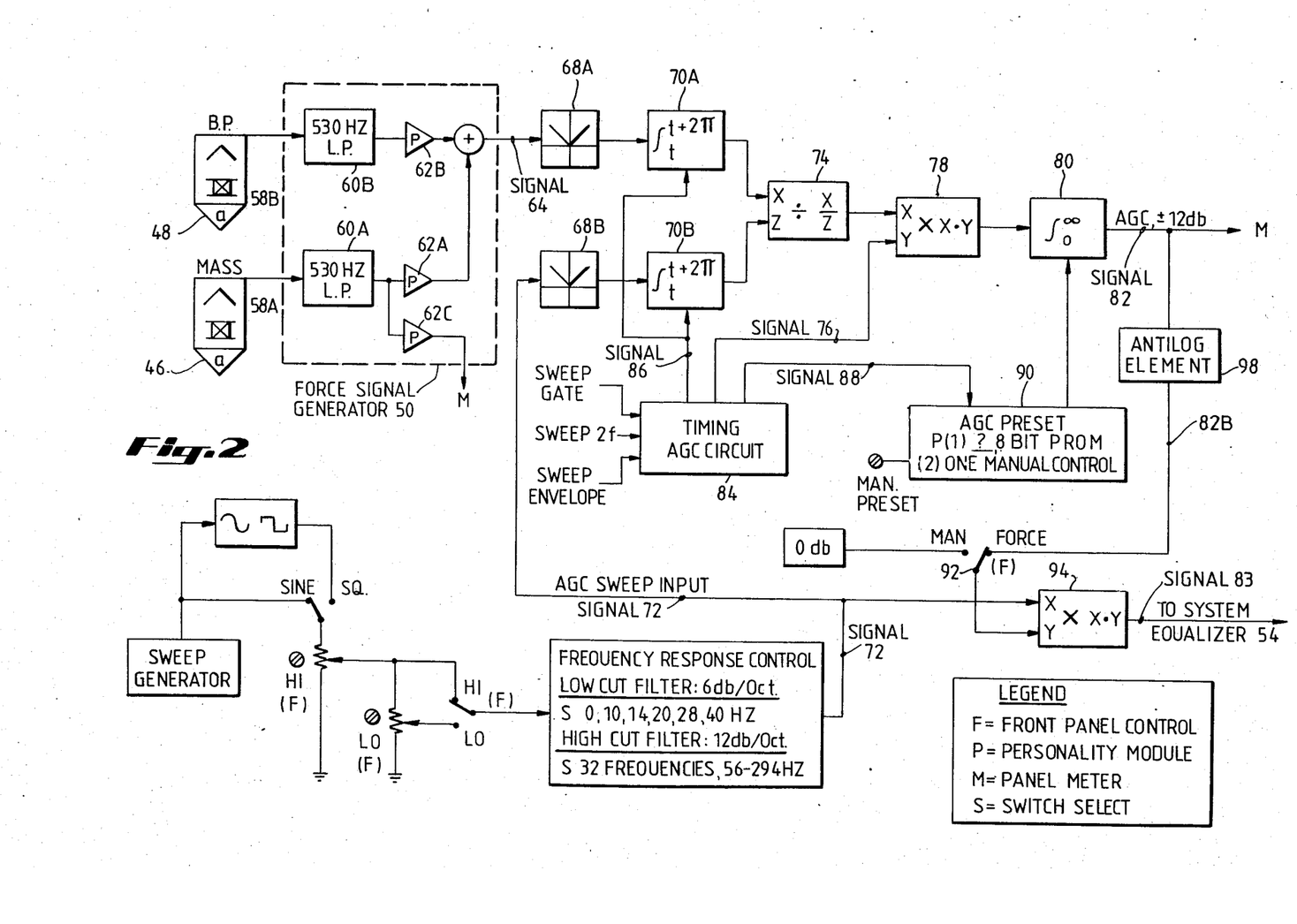
FIG. 2 is a block diagram showing the accelerometers, the force signal generator, and the automatic gain control circuit.

FIG. 2 depicts automatic gain control circuit. The reaction mass accelerometer 46 generates an output signal 58A. The baseplate accelerometer 48 generates an output signal 58B. The force signal generator 50 is coupled to receive the output signals 58A, 58B. The force signal generator 50 filters the signals 58A, 58B in two 530 Hz low pass filters 60A, 60B, amplifies the signals through amplifiers 62A, 62B and 62C, and then generates an output signal 64 which is the sum of signals 58A and 58B after they have been filtered and amplified. The output of the amplifier 62C drives a panel meter 66.

The output signal 64 passes to the absolute value circuit 68A. The absolute value circuit 68A generates the absolute value of the output signal 64. Output signal 64 then passes to the sampling integrator 70A. The sampling integrator 70A integrates signal 64 over one cycle. A sampling integrator 70B takes the integral of the absolute value of the automatic gain control reference signal 72 over the same time interval. The absolute value is taken by the absolute value circuit 68B which is substantially the same as the absolute value circuit 68A. The reference signal 72 has the same frequency as the control signal 64, but can vary in phase. The sampling integrators 70A, 70B are identical gated integrators. At the end of the one cycle sampling period, a ratio circuit 74 divides the output of the sampling integrator 70A by the output of the sampling integrator 70B. The ratio circuit 74 is actually a logarithmic divider, rather than a linear divider. A log ratio circuit is used here rather than a conventional analog divider circuit because of its inherently wider dynamic range. The logarithmic output of the divider circuit 74 is combined with a timing signal 76 in a multiplier circuit 78. The integrator circuit 80 is responsive to the signal from the multiplier circuit 78 and accumulates the integral of the error signal which inturn is a logarithmic control signal to antilog circuit. The output 28B of the antilog circuit 98 is the system automatic gain control voltage.

The automatic gain control (AGC) timing circuit 84 generates not only the timing signal 76 to the multiplier circuit 78, but also provides a timing signal 86 to the sampling integrators 70A and 70B. The timing circuit 84 also generates a timing signal to the AGC preset 90. The AGC preset 90 offers manual control or automatic control by means of an eight-bit Programmable Read Only Memory (PROM) external to this circuit. The front panel control switch 92 selects whether the control signal is modified by automatic gain control circuit 52. If control switch 92 is set to 'manual', the control signal 64 from the force signal generator passes directly to the system response equalizer circuit 54 without being modified by the automatic gain control circuit 52. If the switch 92 is set to the force position, the signal 64 then is modified by the automatic gain control circuit 52 and passes through the system response equalizer circuit 54 before being transmitted back as signal 56 to the servo valve 40 of the seismic hydraulic vibrator 20. To pass to the system response equalizer circuit 54, the AGC sweep input signal 72 is amplitude modulated (multiplied) by the control signal 82B by a gain control element, multiplier 94.

The automatic gain control reference signal 72 is the output of the frequency response control circuit 96. The frequency response control circuit 96 is responsive to either a sine wave, for normal operations, or a square wave, for testing purposes, and comprises switch-selectable low cut filters and switch selectable high cut filters.

Figure 3A:
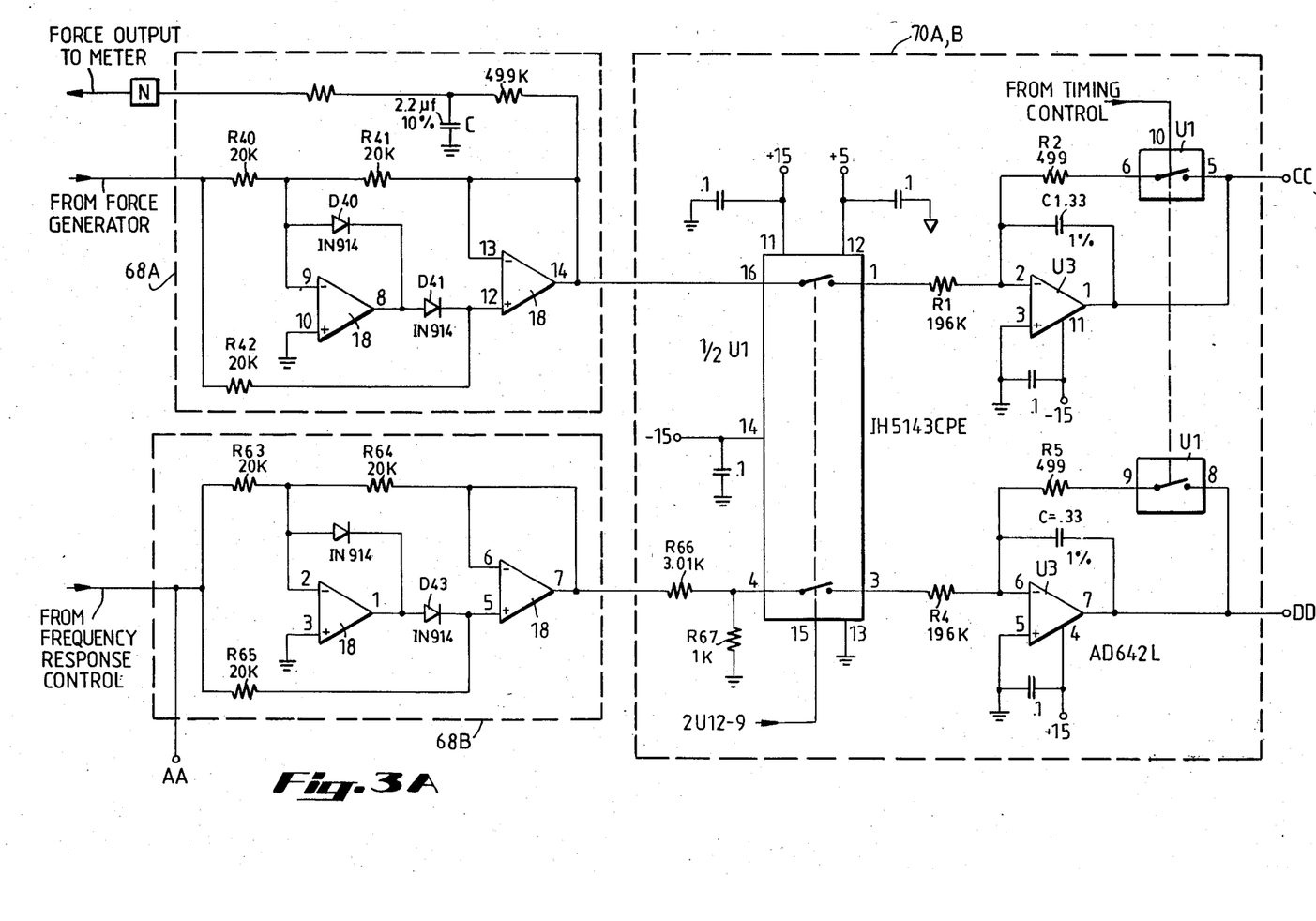
FIGS. 3A, 3B and 3C are a schematic diagram of a preferred implementation of the automatic gain control circuit of FIG. 1.
Figure 3B:
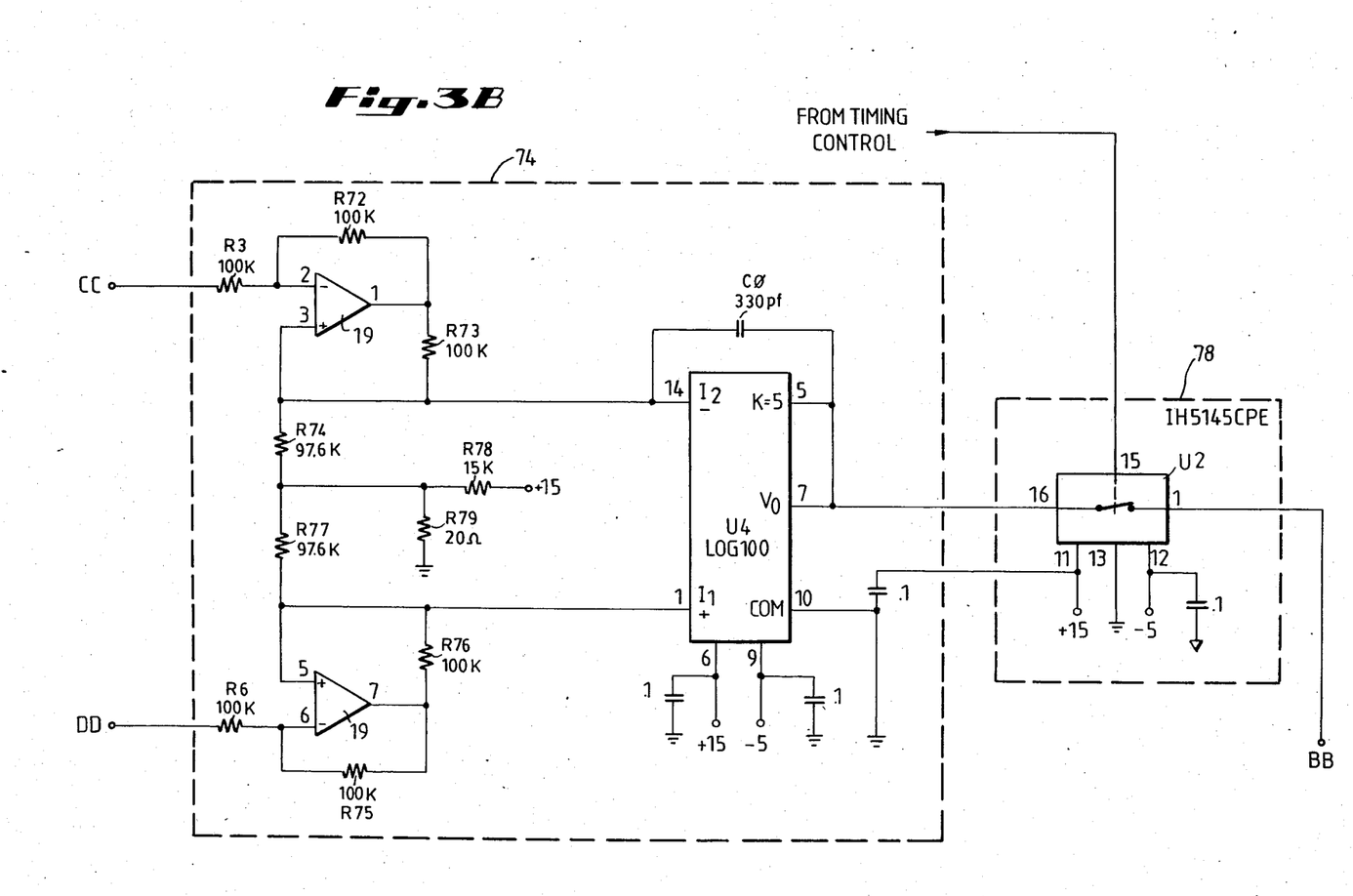
Figure 3C:
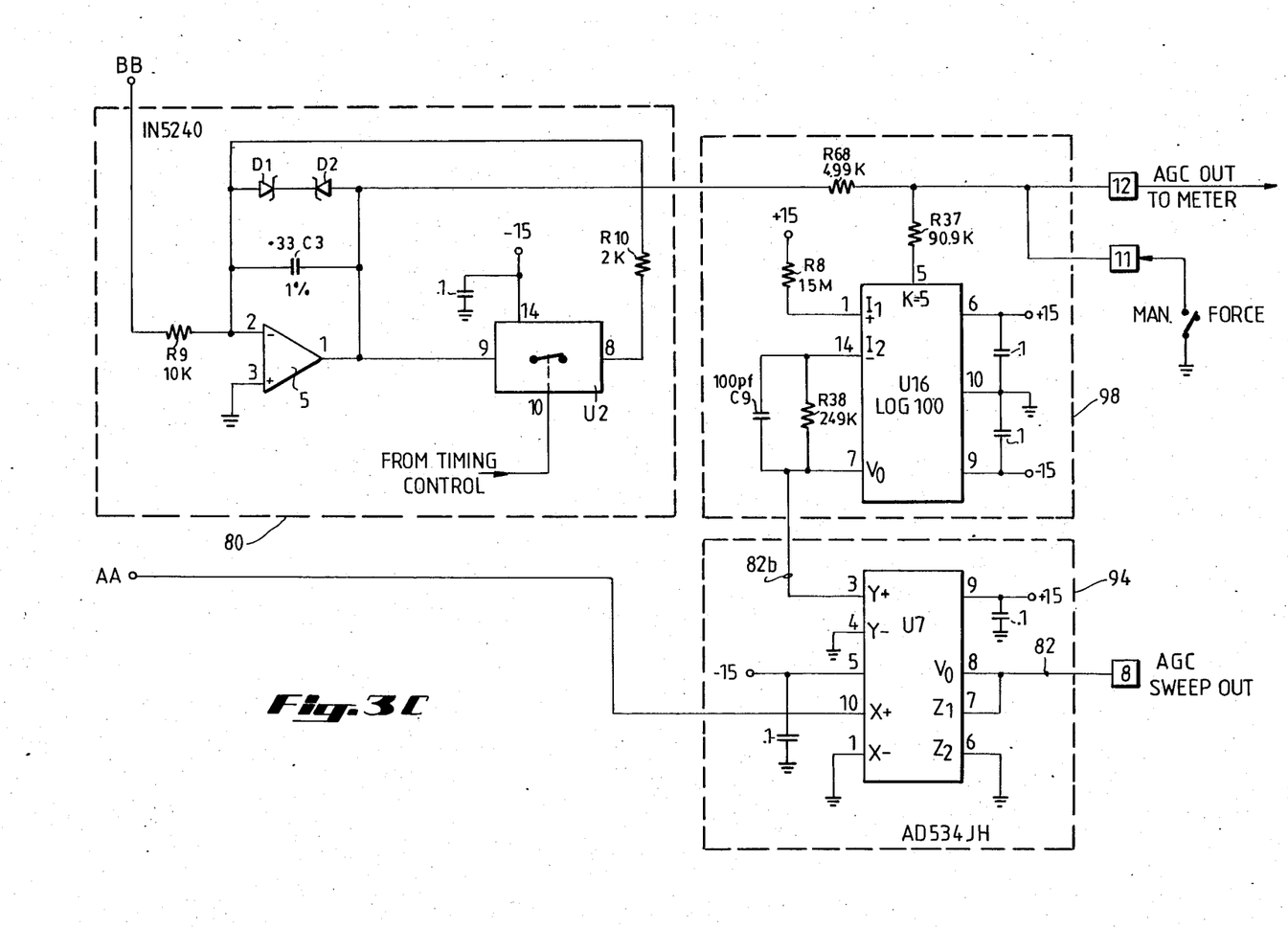

Referring to FIG. 3, the automatic gain control (AGC) circuit 52 is shown in a schematic diagram. As stated previously, the output of the divider circuit 74 of FIG. 3B is a logarithmic value. The divider circuit 74 of FIG. 3B takes the difference of the logarithm of the current values of the inputs representative of the control signal and the reference signal. In the integrator circuit 80, the antilog element 98 is responsive to the logarithmic ratio generated by the divider circuit 74 of FIG. 3B, and in response to the output of the multiplier circuit 78 of FIG. 3B generates the antilog. The output of the antilog element 98 of FIG. 3C is the signal 82B which is combined with the AGC sweep input signal 72 by the multiplier 94 of FIG. 3C so as to control the amplitude of signal 83.

Figure 4:
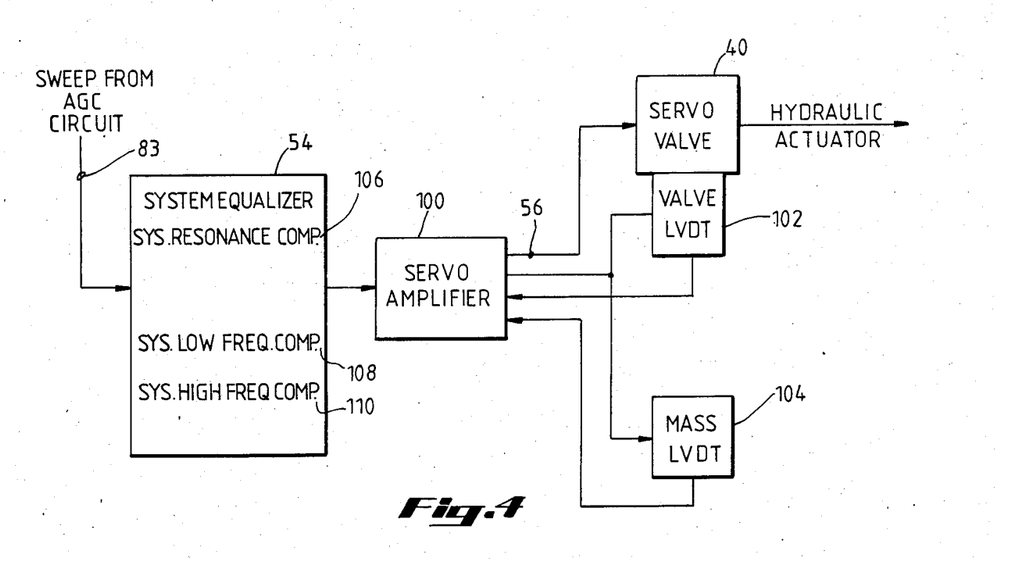
FIG. 4 is a block diagram showing the system response equalizer circuit with its associated amplifier, connected to the servo valve of the seismic hydraulic vibrator.

FIG. 4 depicts the system response equalizer circuit 54, shown with its associated servo amplifier 100 and the servo valve 40 of the seismic hydraulic vibrator 20. The signal from the linearly variable differential transformers (LVDT): the valve LVDT 102, and the reaction mass LVDT 104, also passes to the servo amplifier 100.

The system response equalizer circuit 54 comprises four subcircuits: the system resonance compensation circuit 106, the system low frequency compensation circuit 108, the system high frequency compensation circuit 110.

Figure 5:
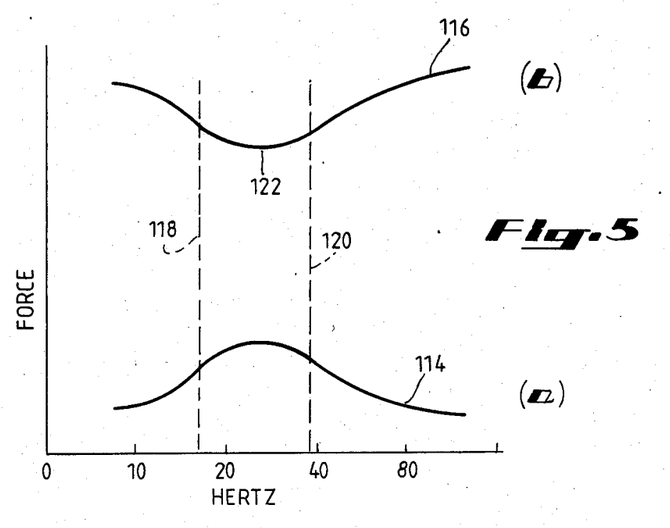
FIG. 5A is a graph showing the typical curve of the earth force with respect to frequency.
FIG. 5B is a graph showing the inverse of the earth force curve.

FIG. 5A shows a curve 114 which is representative of the input signal 83 to the system response equalizer circuit 54. The response equalizer approximates the inverse curve 116 of the curve 114. The system resonance compensation circuit 106 approximates the inverse curve 116 between the lines 118 and 120. Switches, such as 4-bit switches may be utilized to control the center frequency of the "dip", or notch 122. Similarly, the amplitude of the notch 122, and the width or "Q" of the notch 122 can be controlled by 4-bit switches. The center frequency, fo, of the notch 122 can be any one of 16 different frequencies, ranging from 12 to 40 Hz and the amplitude of the notch 122 can be any one of sixteen different amplitudes ranging from zero to minus twelve decibels. In one embodiment, the "Q" of the notch may be fixed at a preselected valve. Accordingly, the "Q" of the notch 122 established at one of sixteen different "Qs" by a set of 4-bit switches as are utilized to establish the center frequency.

The system low frequency compensation circuit 108 approximates the inverse curve 116 to the left of line 118, by producing a 6 decibel per octave rising response with decreasing frequency. A 4-bit switch selects one of sixteen frequencies from nine to twenty-four Hz.

The system high frequency compensation circuit 110 approximates the inverse curve 116 to the right of the line 120. The total gain of the high frequency circuit 110 is nine decibels (9 db). A four-bit switch can be used to select one of eight transition frequencies from 40 to 150 Hz, or a field adjustable personality module can be set at one frequency. The low frequency compensation circuit 108 provides the operator with an external manual adjustment.

Figure 6A:
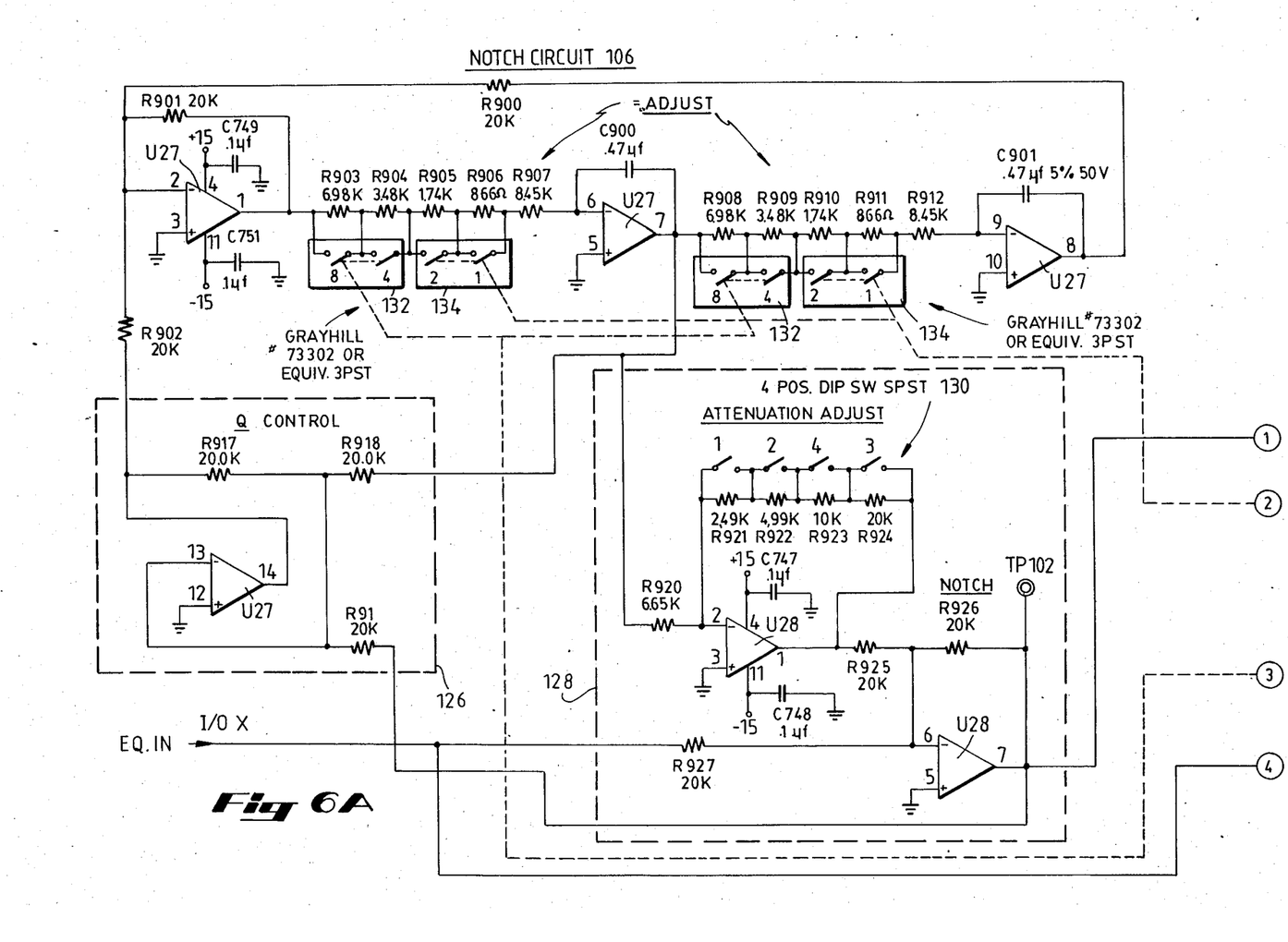
FIG. 6 is a schematic diagram of a preferred implementation of the system response equalizer circuit of FIG. 1.
Figure 6B:
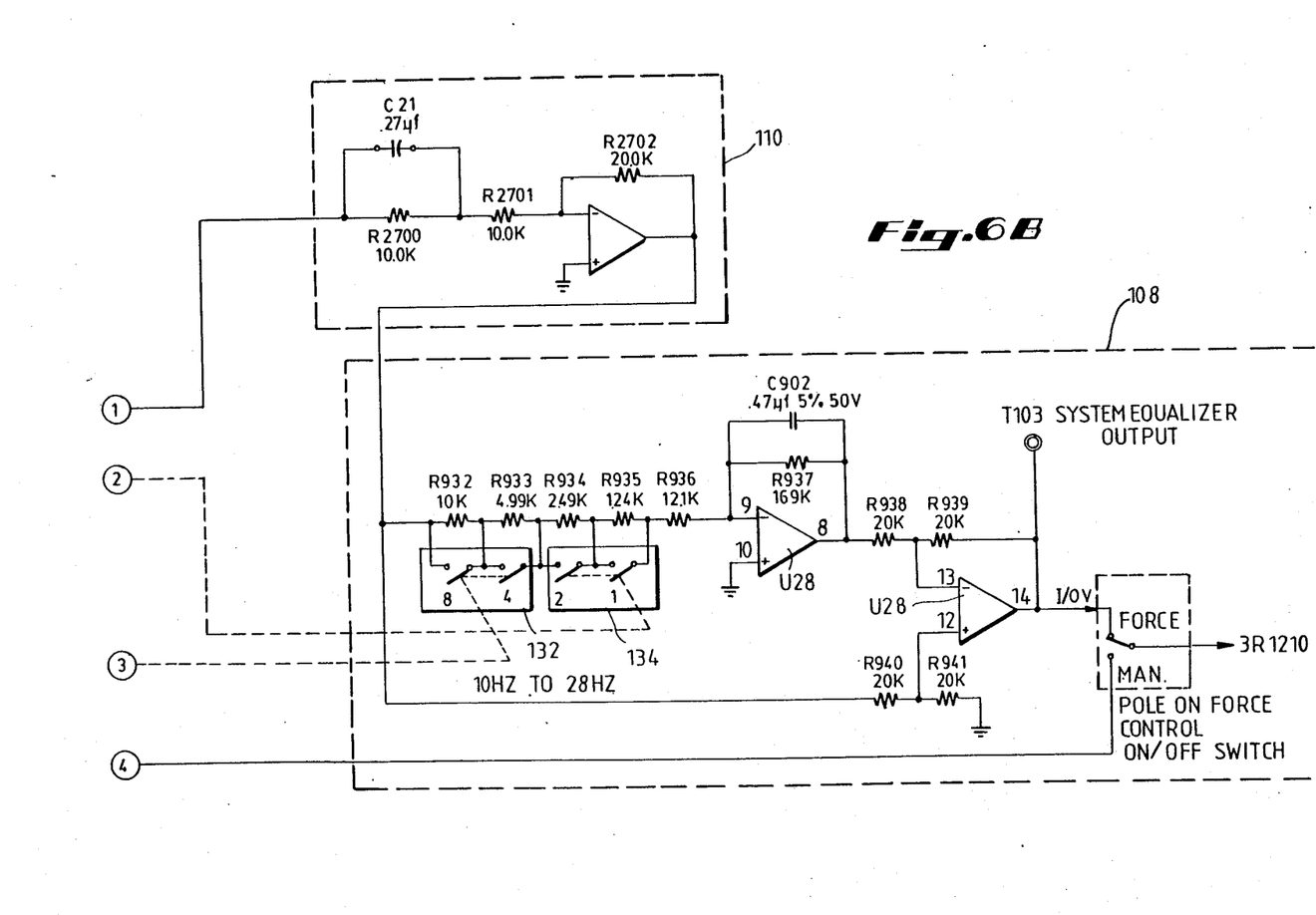
Figure 7:
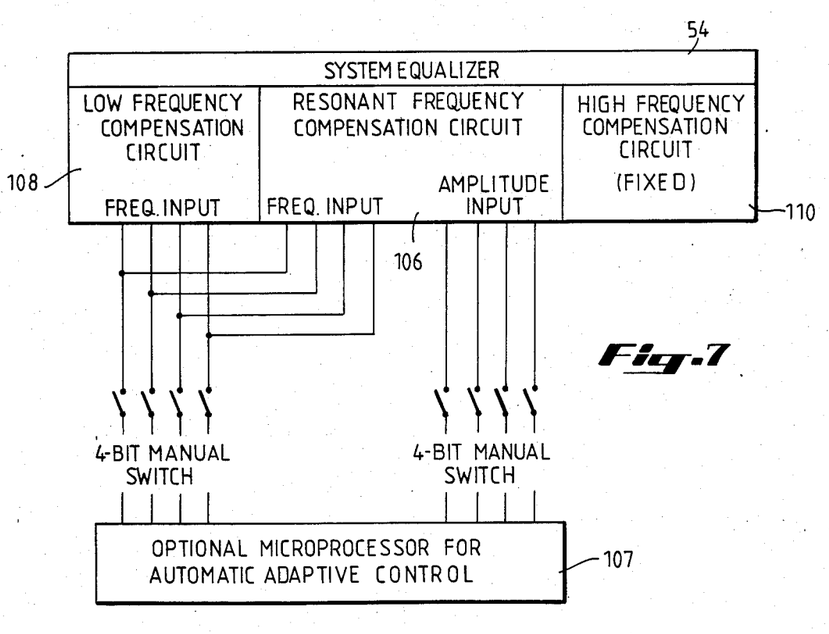
FIG. 7 depicts the system response equalizer circuit of FIG. 1 in block diagram form.

FIG. 6 depicts system response equalizer circuit 54 in schematic representation. The center frequency adjust circuit 124 generates the center frequency of the notch 122. The Q control circuit 126 selects the width or 'Q' of the notch 122. The attenuation adjust circuit 128 controls the attenuation of the notch 122. There is no interaction between the Q control circuit 126 and the attenuation adjust circuit 128. The selective of these two parameters gives the system resonance compensation circuit 106 optimal flexibility in closing approximating the inverse curve 116 of signal 83. Although the Q control circuit 126 could have a four-bit switch to give 16 different possible Q's, the Q control circuit 126 as presently shown in FIG. 6 does not use a four-bit switch, but rather the circuit fixes the value of Q at $Q=1$.

The notch circuit 106 achieves a certain efficiency of components in the use of the four-bit switches. Although the attenuation adjust circuit 128 has its own dedicated four-bit switch 130, the four-bit switch 132 and the four-bit switch 134 are shared by the center frequency adjust circuit 124 and the low frequency compensation circuit 108. As can be seen from FIG. 6, and the foregoing discussions of system resonance compensation circuit 106, system low frequency compensation circuit 108 and system high frequency compensation circuit 110, the circuitry of system equalizer circuit 54 will modify the AGC sweep out signal 83 such that the output 56 of system equalizer circuit 54 represents a combination of the inverse transfer function of the vibrator force with the drive, (AGC sweep out), signal 83.

The foregoing description of the invention has been directed to a particular preferred embodiment in accordance with the requirements of the patent statute and for purposes of explanation and illustration. It will be apparent, however, to those skilled in this art that many modifications and changes in the embodiments described and illustrated herein may be made without departing from the spirit and scope of the invention.

The following claims are intended to cover such modifications and variations as fall within the true spirit and scope of the invention.

What is claimed is:

1. In a seismic hydraulic vibrator in which an electrohydrualic servo mechanism is used to reciprocally drive a baseplate in response to an electrical input signal, the improvement comprising:

means for generating a first signal which is the integral of the absolute value over one cycle of a measured signal representative of the magnitude of the fource of the hydraulic vibrator;

means for comparing said first signal to a supplied reference signal to generate an error signal;

means for generating a drive signal, the amplitude of said drive signal being controlled by said error signal so that said error signal is reduced to substantially zero;

means for generating substantially the inverse transfer function of the hydraulic vibrator force and combining said inverse transfer function with said drive signal to modify said drive signal; and means for driving said baseplate in response to said modified drive signal.

2. The seismic vibrator of claim 1, wherein said supplied reference signal comprises said electrical input signal.

3. The seismic vibrator of claim 2, wherein said means for comparing said first signal to a supplied reference signal comprises:

means for generating a signal which is the integral of said input signal over at least one cycle; and divider circuitry adapted to generate a ratio between said first signal and said input signal.

4. A method for controlling a hydraulic seismic vibrator having a baseplate, a reaction mass and a mechanism responsive to an electrical input signal for moving said baseplate, comprising the steps of:

generating a first signal representative of the force on said baseplate when said vibrator is actuated;

generating a second signal representative of the integral of the absolute value of said first signal over a sample time period including at least one cycle;

comparing said second signal to a reference value;

generating an error signal in response to said step of comparing said second signal to a reference value; and generating a drive signal to actuate said baseplate, said drive signal generated in response to said error signal.

5. The method of claim 4, wherein said step of generating a first signal representative of the force of said baseplate comprises the steps of:

measuring the acceleration of said baseplate when said vibrator is actuated;

measuring the acceleration of said reaction mass when said vibrator is actuated; and generating a signal in response to said measured accelerations of said baseplate and said reaction mass.

6. The method of claim 4, wherein said reference value comprises said circuited input signal.

7. The method of claim 6, wherein said step of comparing said second signal to a reference value comprises the steps of:

generating a reference signal representative of the absolute value of said electrical input signal over a time period of at least one cycle, said sample time period being the same as that sample time period for said second signal.

8. The method of claim 7, further comprising the step of modifying said drive signal by varying the amplitude of said drive signal within a selected frequency range.

9. A hydraulic seismic vibrator, comprising:

a baseplate;

a reaction mass;

an electrohydraulic mechanism responsive to an electrical input signal for actuating said baseplate;

means for generating a first signal representative of the force of said baseplate when said vibrator is actuated;

means for generating a second signal representative of the integral of the absolute value of said first signal over a sample time period including at least one cycle;

means for comparing said second signal to a reference value;

means for generating an error signal in response to said comparison between said second signal and said reference value; and means for correlating said error signal and said electrical input signal to generate a drive signal to actuate said baseplate.

10. The vibrator of claim 9, wherein said means for generating a first signal representative of the force of said baseplate comprises:

an accelerometer coupled to said baseplate;

an accelerometer coupled to said reaction mass; and means for combining signals from said baseplate accelerometer and said reaction mass accelerometer to generate said first signal.

11. The hydraulic vibrator of claim 9, wherein said reference value comprises said electrical input signal.

12. The hydraulic vibrator of claim 11, wherein said means for comparing said second signal to a reference value comprises means for generating a reference signal representative of the absolute value of said electrical input signal over a time period of at least one cycle, said sample time period being the same as that sample time period for said second signal.

13. The hydraulic vibrator of claim 9, further comprising means for modifying said drive signal by altering the amplitude of said drive signal within a selected frequency range.

* * * * *